United States Patent [19]
Moore et al.

[11] Patent Number: 5,351,329
[45] Date of Patent: Sep. 27, 1994

[54] METHOD AND APPARATUS FOR AFFIXING AN OPTIC FIBER TIP IN POSITION WITH RESPECT TO A FIBER COMMUNICATIONS CIRCUIT OUTSIDE AN OPTICS PACKAGE

[75] Inventors: Andrew J. Moore; David L. Ma; Robert L. Bontz; Charles C. Burns, all of Plano, Tex.

[73] Assignee: Alcatel Network Systems, Inc., Richardson, Tex.

[21] Appl. No.: 994,709

[22] Filed: Dec. 22, 1992

[51] Int. Cl.⁵ .......................... G02B 6/00; G02B 6/36
[52] U.S. Cl. ..................................................... 385/92
[58] Field of Search ................................. 385/88–94

[56] References Cited

U.S. PATENT DOCUMENTS

| | | | |
|---|---|---|---|
| 4,030,811 | 6/1977 | Khoe et al. | 385/91 |
| 4,474,429 | 10/1984 | Yoldas et al. | 385/88 X |
| 4,500,165 | 2/1985 | Scholl et al. | 385/91 |
| 4,702,556 | 10/1987 | Ishii et al. | 385/91 |
| 4,729,623 | 3/1988 | Mery | 385/91 |
| 4,741,796 | 5/1988 | Althaus et al. | 385/91 |
| 4,883,342 | 11/1989 | Ishii et al. | 385/90 |
| 5,101,464 | 3/1992 | Mousseaux et al. | 385/88 |
| 5,107,537 | 4/1992 | Schriks et al. | 385/91 |
| 5,222,170 | 6/1993 | Bargar et al. | 385/91 X |

*Primary Examiner*—Akm E. Ullah
*Attorney, Agent, or Firm*—Vinson & Elkins

[57] ABSTRACT

In one embodiment, the present invention includes a method of installing an optic fiber in an optics package, wherein the tip of the fiber extends from a sleeve. In one step, a point of the fiber proximate its tip is affixed in a retaining member adjacent a device for communicating signals through the fiber. In a second step, a flexible member is disposed between the retaining member and the sleeve and in axial alignment with the fiber. In a third step, the optic fiber is positioned in the optics package after the step of affixing the fiber in place with the respect to the communicating device. In another embodiment, the present invention includes an optics assembly including an optic fiber having a tip extending from a sleeve and a device for communicating signals through the fiber. The assembly further includes a retaining member for affixing the fiber tip proximate the device for communicating signals through the fiber. Finally, the assembly includes a flexible member attached between the retaining member and the sleeve.

13 Claims, 7 Drawing Sheets

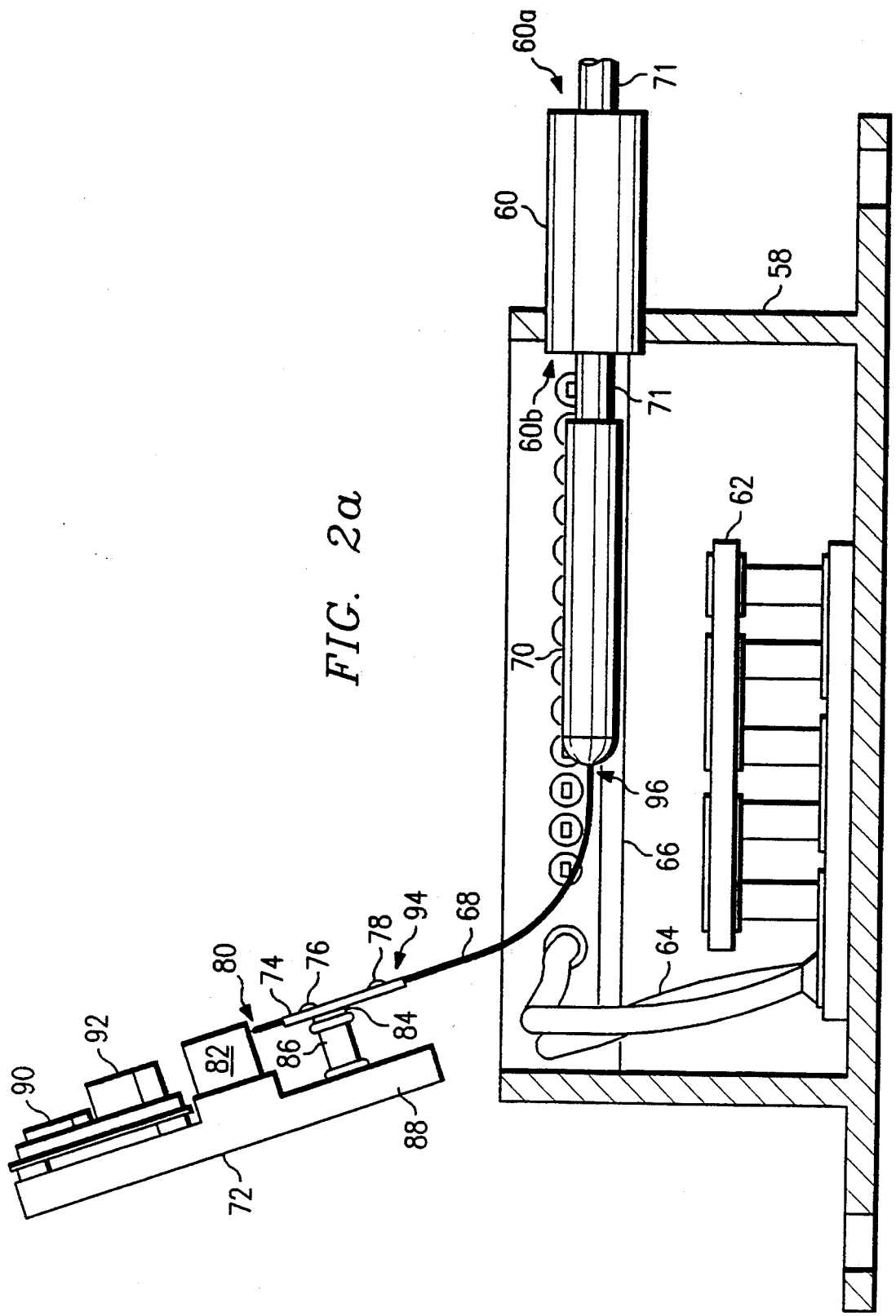

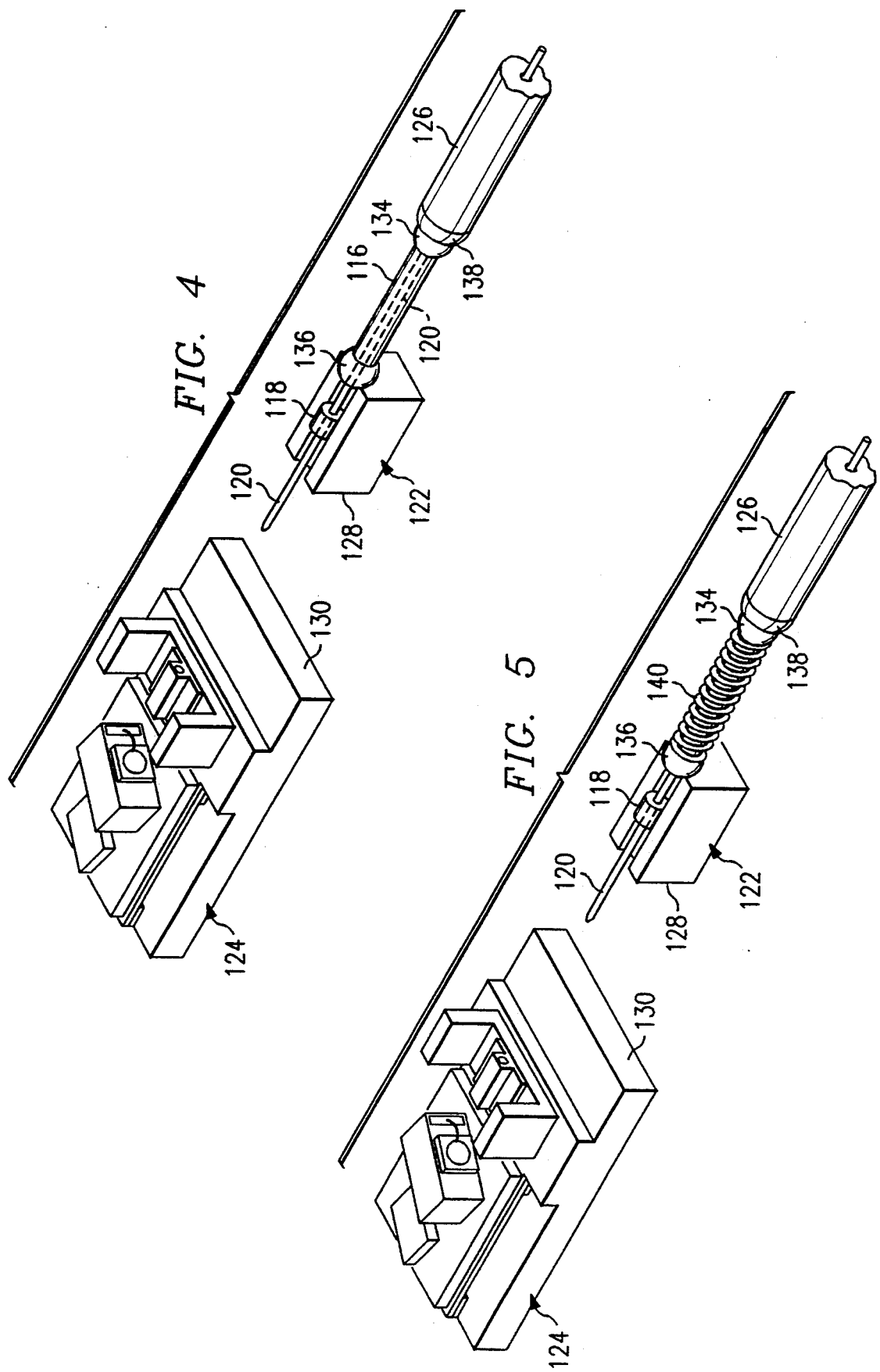

METHOD AND APPARATUS FOR AFFIXING AN OPTIC FIBER TIP IN POSITION WITH RESPECT TO A FIBER COMMUNICATIONS CIRCUIT OUTSIDE AN OPTICS PACKAGE

This invention relates to the field of fiber optic communications, and is more particularly directed to a method and apparatus for affixing an optic fiber tip in position with respect to a fiber communication circuit outside an optics package.

BACKGROUND OF THE INVENTION

The use of fiber optic technology in the communications industry continues to increase. Fiber optic communications provide numerous advantages such as increased bandwidth, less noise, lower signal-to-noise ratio requirements, and lower error rates. In addition, the use of fiber optic cable relative to metallic conductors permits a much larger traffic of communication to occupy the same space previously required by metallic conductors.

As known in the art, communication of signals through an optic fiber is accomplished by placing communications circuitry at the tips of both ends of the optic fiber. For purposes of this document, such communications circuitry includes "photonic devices", that is, devices for conversion of signals between electrical and optical media. FIG. 1a illustrates a perspective view of certain components of such a system. Specifically, FIG. 1a illustrates a perspective and cut-away view of a prior art fiber optics package 10. Package 10 is typically a parallelepiped in shape, having a length on the order of 1.0 inches and a width and height on the order of 0.75 inches.

Package 10 is typically constructed of Kovar and houses various components. These components, as described in greater detail below, are commonly disposed through the top of package 10, thereby providing limited access to the components once they are affixed within the interior of package 10. After the components are properly installed within package 10, a top (not shown) is sealed to the package by a known resistive seam weld process, thereby hermetically sealing the components from contaminants exterior to package 10.

A ferrule 12 is attached to package 10 and permits access through a hole or "pass-through" in one side of package 10. Typically, ferrule 12 is 0.200 inches in length and 0.125 inches in the outside diameter. An optic fiber 14 extends from a sleeve 16. Optic fiber is on the order of 0.005 inches in diameter, and extends a length of 0.500 inches from sleeve 16. As described in greater detail below, optic fiber 14 is fitted through ferrule 12. Consequently, the tip 18 of fiber 14 may be fixed in position with respect to circuitry within package 10. Although sleeve 16 is shown in a cut-away view, it should be understood that it (or a lesser protective layer such as a buffer coating) extends for a length typically on the order of 1.0 meters outward of package 10.

With reference to the interior of package 10, a thermal electric cooler 20 is affixed to the bottom of package 10. Thermal electric cooler 20 supports, via a deposit of solder (not shown), a carrier 22. Carrier 22 supports various components known in the art. For example, carrier 22 supports a thermistor 24 and a backwave detector 26. Carrier 22 also supports a U-shaped subcarrier 28. A submount 30 is disposed on top of subcarrier 28 and supports a laser 32. Laser 32 communicates signals to tip 18 of fiber 14 (once fiber 14 is correctly positioned with respect to laser 32). While FIG. 1a illustrates a transmitter (i.e., laser 32), it should be understood that a receiving device, such as a photodiode, could be included as an alternative. Moreover, the circuitry for communicating to/from the fiber could be a transceiving device as well.

Carrier 22 further includes an integral extension 34 which supports an adjustment post 36. A portion of solder (not shown) is disposed on the top 38 of adjustment post 36 to support a retaining slab 40 (shown in FIG. 1a outside package 10 and proximate fiber 14). Retaining slab 40 includes a longitudinal groove 42 which, as described in greater detail below, retains optic fiber 14 in a fixed position with respect to laser 32.

Package 10 also houses an integrated circuit 44 which connects in various manners to the componentry of carrier 22, and also to a series of package pins 46. A pair of power conductors 48 are connected to respective power pins 50. Thus, signal interaction to the communications circuitry, and power supply to thermal electric cooler 20, may be accomplished external from package 10 by accessing pins 46 and 50.

FIG. 1b illustrates package 10 of FIG. 1a with optic fiber 14 affixed in place with respect to the communications circuitry housed by package 10. Specifically, as appreciated from FIG. 1b, sleeve 16 is fitted through ferrule 12 such that fiber 14 extends inward within package 10. Fiber 14 is affixed within groove 42 of retaining slab 40 by use of solder (for metalized fiber) or epoxies (typically for a non-metalized fiber). Specifically, either of these materials are used to form deposits 52 and 54 along slab 40. In addition, a solder deposit 56 is formed between ferrule 12 and sleeve 16 to prohibit contaminants from passing between the two components and into the interior of package 10.

Once fiber 14 is affixed to slab 40, slab 40 is placed in contact with the solder deposit formed on top 38 (see FIG. 1a) of adjustment post 36. Particularly, slab 40 is situated to position the tip 18 of fiber 14 in a precise position with respect to laser 32. As is known in the art, typically the tolerance for locating tip 18 is on the order of 0.1 to 2.0 microns. Having located slab 40 in place, heat is applied to cause the solder between it and adjustment post 36 to flow. Thereafter, the solder is permitted to cool, thereby affixing slab 40 and fiber tip 18 in place. Typically, signal measurements are then made through fiber 14 to ensure that it is affixed within proper tolerance and is communicating effectively with laser 32. If outside the acceptable tolerance, the solder is reheated and the process is performed again until acceptable tolerances are met.

From the above, it may be appreciated that the prior art requires performance of incredibly complicated and delicate procedures within the confines of package 10 to properly position the optic fiber tip 18 in place with respect to laser 32. As stated above, package 10 is typically on the order of 1.0 inches in length and 0.75 inches in width. Consequently, the complexities of affixing the optic fiber in place are vastly increased because of the spatial limitation imposed by package 10. Further, the processes described above often require manipulation of various tools such as probes, lasers and tweezers within the tiny area created by the top-access of package 10. These limitations not only lengthen the task, but increase the opportunity to damage any of the various components within package 10 while completing the affixation process.

It is therefore an object of the present invention to provide a method and apparatus for precisely affixing an optic fiber tip in position with respect to a fiber communications circuit outside of the fiber optics package.

It is further object of the present invention to provide such a method and apparatus for reducing the possibility of damage to the optic fiber while installing it in a fiber optics package.

It is a further object of the present invention to provide such a method and apparatus for reducing the possibility of dislodging the mechanism retaining the optic fiber in place while installing it in a fiber optics package.

It is a further object of the present invention to provide such a method and apparatus for providing an inventory of individual optic fibers fixed in position with respect to respective communications circuits, but readily available for insertion into various different types of fiber optics packages.

Still other objects and advantages of the present invention will become apparent to those of ordinary skill in the art having reference to the following specification together with its drawings.

SUMMARY OF THE INVENTION

In one embodiment, the present invention includes a method of installing an optic fiber in an optics package, wherein the fiber has a tip extending from a sleeve. In one step, a point of the fiber proximate its tip is affixed in a retaining member adjacent a device for communicating signals through the fiber. In a second step, a flexible member is disposed between the retaining member and the sleeve and in axial alignment with the fiber. In a third step, the optic fiber is positioned in the optics package after the step of affixing the fiber in place with the respect to the communicating device.

In another embodiment, the present invention includes an optics assembly including an optic fiber having a tip extending from a sleeve and a device for communicating signals through the fiber. The assembly further includes a retaining member for affixing the fiber tip proximate the device for communicating signals through the fiber. Finally, the assembly includes a flexible member attached between the retaining member and the sleeve.

Still other embodiments and features are described, as set forth in the following brief and detailed descriptions of the present invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2a illustrates a side view of an optics package being loaded with a carrier assembly having an optic fiber previously affixed in position with respect to the communications circuitry of the assembly;

FIG. 3b illustrates an optic fiber affixed to a carrier assembly external from an optics package, wherein the optic fiber is supported by the flexible member of FIG. 3a;

FIG. 4 illustrates an alternative embodiment to the components of FIG. 3b, wherein different mechanisms are used both for controlling flexibility of the optic fiber and affixing it in position with respect to the carrier-supported communications circuitry; and FIG. 5 illustrates the embodiment of FIG. 4 with an alternative flexible member between the optic fiber sleeve and fiber retaining mechanism.

DETAILED DESCRIPTION OF THE INVENTION

Figure 1A:
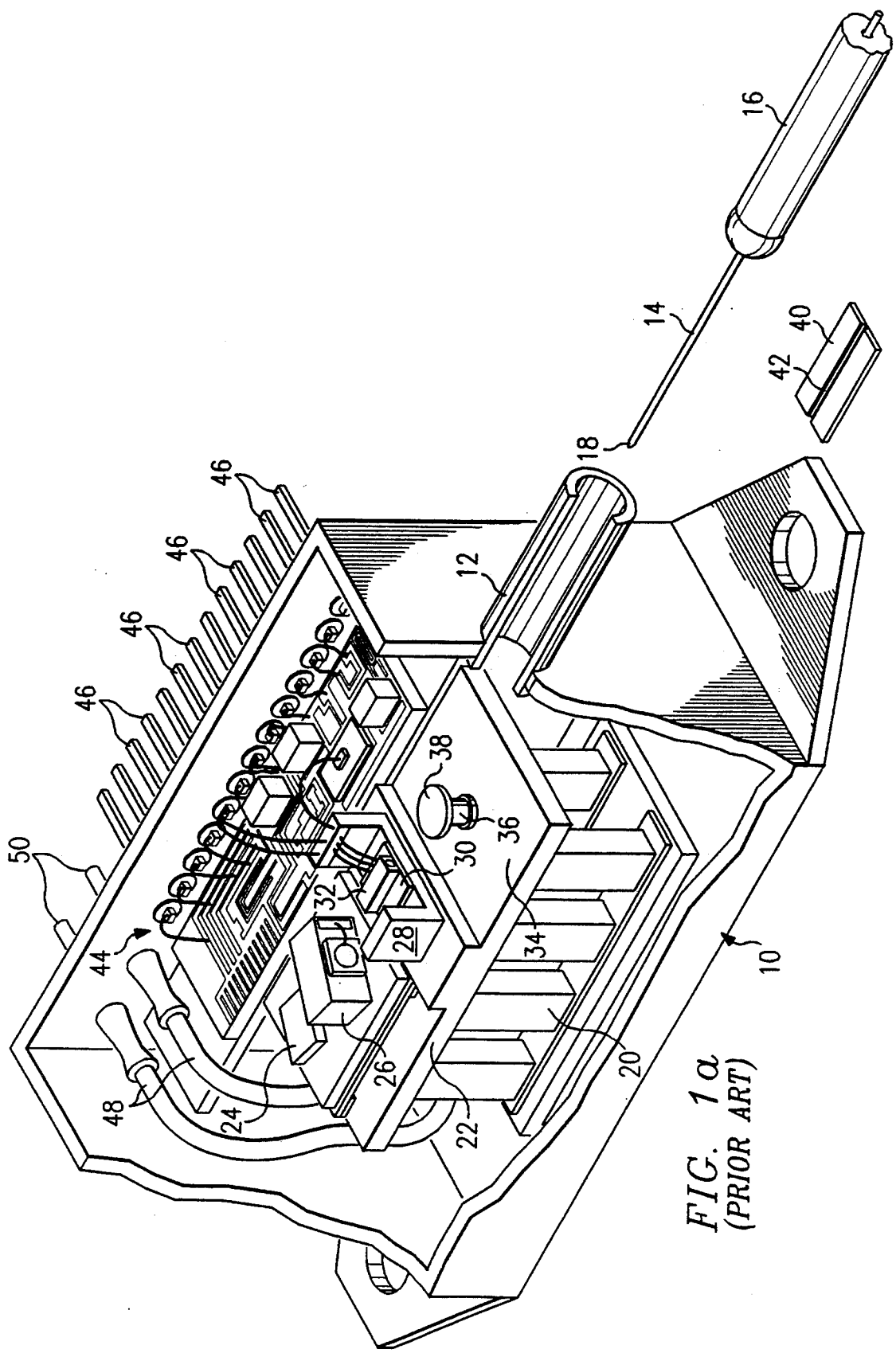
FIG. 1a illustrates a perspective and cut-away view of a fiber optics package housing various components, and an optic fiber and sleeve external to the package.
Figure 1B:
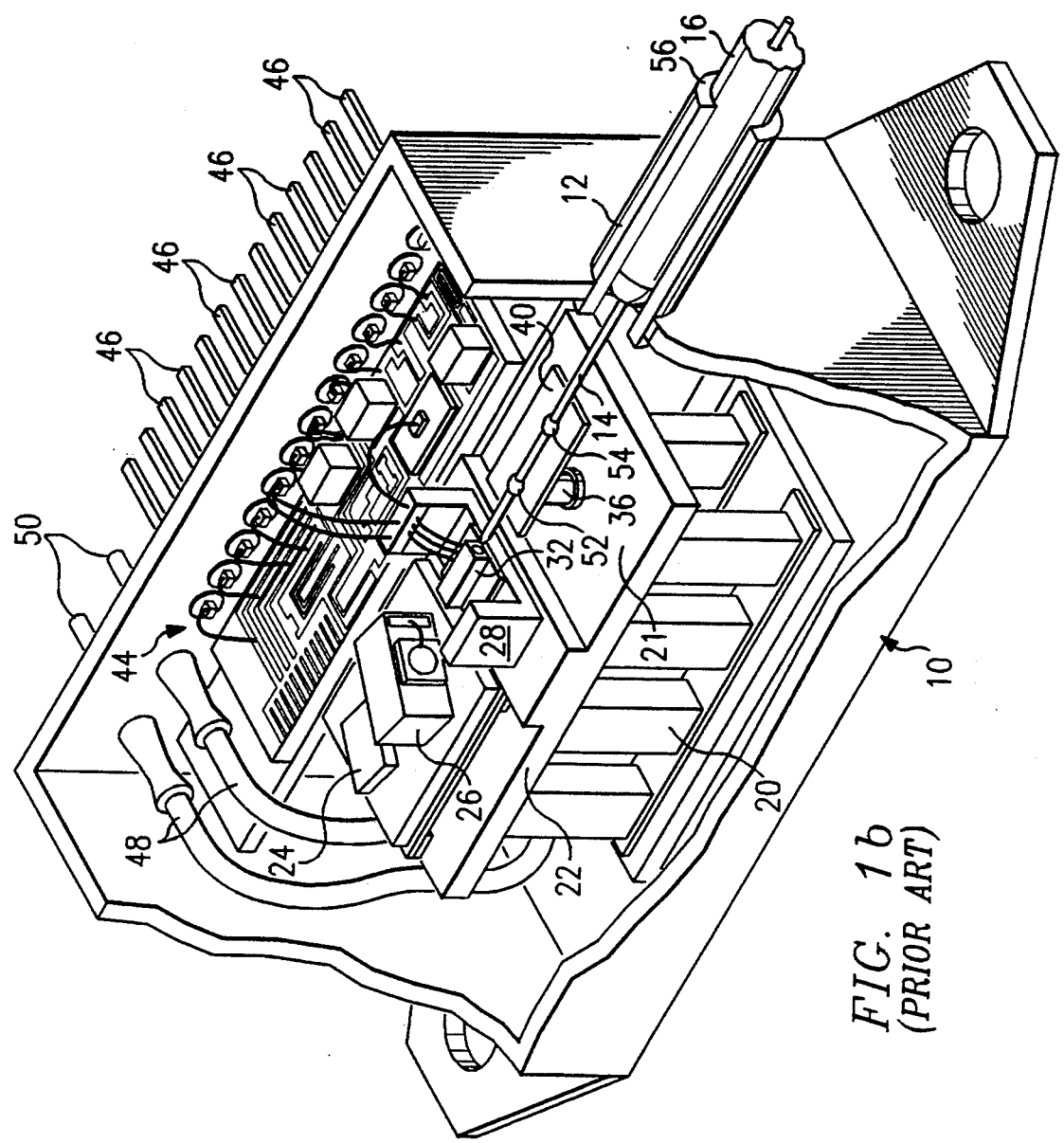
FIG. 1b illustrates a perspective and cut-away view of the components of FIG. 1a wherein the optic fiber and sleeve are installed within the optics package.

The preferred embodiment of the present invention and its advantages are best understood by referring to FIGS. 1a–5 of the drawings, like numerals being used for like and corresponding parts of the various drawings.

FIG. 2a illustrates a side view of one aspect of the present invention. Specifically, FIG. 2a illustrates component parts which are the same as those illustrated in FIG. 1a, above. Under one aspect of the present invention, however, the methodology for assembling the component parts is vastly different from the prior art. Before proceeding with that methodology, a brief reiteration of the various component parts shown in FIG. 2a is as follows.

FIG. 2a illustrates a fiber optics package 58 with a ferrule 60 in one end of package 58. Ferrule 60 provides access through a pass-through hole into the interior of package 58. Package 58 also houses a thermal electric cooler 62. Thermal electric cooler 62 is coupled via power conductors 64 to a pair of power pins (not shown). Package 58 also houses a circuit shelf 66 which supports an integrated circuit (not shown) such as circuit 44 shown above in connection with FIGS. 1a–1b. Package 58 is dimensioned and constructed in the same manner as package 10. Thus, package 58 is on the order of 1.0 inches length and 0.75 inches in height and width, and is made of Kovar.

FIG. 2a further illustrates an optic fiber 68 extending from a sleeve 70. Sleeve 70 is on the order of 0.069 inches in diameter, and also is on the order of 0.400 inches in length. A buffer coating 71 extends beyond sleeve 70 and through ferrule 60. Buffer coating is typically on the order of 0.040 inches in diameter, and extends approximately 1.0 meter in length.

Optic fiber 68 is fixed in position with respect to a carrier 72. Specifically, optic fiber 68 is affixed within a retaining slab 74 by deposits 76 and 78. Accordingly, the tip 80 of optic fiber 68 is fixed in position with respect to a laser or other communications circuitry (not shown) supported by a subcarrier 82 and a submount (not shown). Retaining slab 74 is affixed via a solder deposit 84 to a adjustment post 86. Adjustment post 86 is attached to an integral extension 88 of carrier 72.

Finally, carrier 72 also supports a thermistor 90 and a backwave detector 92.

According to the method of the present invention, optic fiber 68 is affixed in place with respect to the communications circuitry supported by carrier 72 before installing the assembly within package 58. In one embodiment, this affixation process occurs in the same general manner as discussed in connection with FIG. 1b with one key difference: in the present invention, the process of affixing optic fiber 68 in place is accomplished outside of the confines of package 58. Thus, before inserting carrier 72 into package 58, optic fiber 68 is disposed within a groove of retaining slab 74 and then affixed in place via deposits 76 and 78. Thereafter, and again before inserting carrier 72 into package 58, retaining slab 74 is positioned so that tip 80 is appropriately located. Solder 84 is then heated to affix retaining slab 74 in place. Finally, a signal is tested through optic fiber 68 to ensure that its tip has been correctly positioned within acceptable tolerances. If the tolerances are unacceptable, the steps of heating solder 84 and repositioning retaining slab 74 are repeated until a final acceptable tolerance is achieved. Under the method of the present invention, therefore, it should be appreciated that the complicated and meticulous steps required in affixing the optic fiber in position with respect its associated communications circuitry are performed outside of package 58. Accordingly, the spatial limitations provided in the prior art, namely, the access solely from the top of package 58, are eliminated. Consequently, the operator or operating device performing the affixation steps is afforded much greater spatial flexibility in handling the delicate components shown in FIG. 2a. Thus, the process is simplified with a corresponding reduction in complexity, time and cost.

Figure 2B:
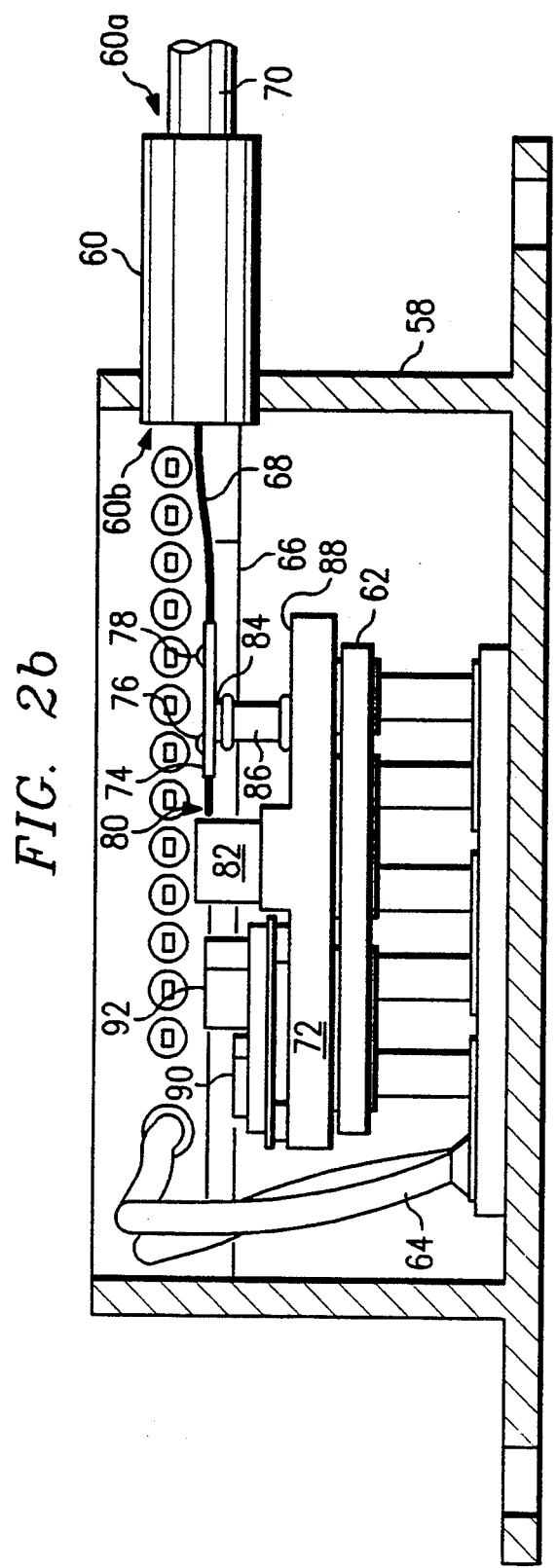
FIG. 2b illustrates the carrier assembly of FIG. 2a once installed within an optics package.

After optic fiber 68 has been successfully affixed within tolerances to carrier 72, the assembly is installed into package 58 as shown in FIG. 2b. In the preferred embodiment, this process begins by placing a solder flux and preform (not shown) on the top surface of thermal electric cooler 62 to provide a coupling to the bottom of carrier 72. Thereafter, buffer coating 71 extending from sleeve 70 is positioned axially through the interior end 60b of ferrule 60 toward its exterior end 60a (see FIG. 2a). In the preferred embodiment, sleeve 70 is entirely encased within ferrule 60 and, hence, does not appear in FIG. 2b. Finally, the carrier bottom surface is raised to a temperature on the order 185° C. so that the solder between thermal electric cooler 62 and carrier 72 begins to flow. The package is then permitted to cool, thereby establishing a fixed bond between thermal electric cooler 62 and carrier 72.

From the above, it may be appreciated that the inventive method described thus far provides numerous advantages over the prior art. In implementation of this method, however, it has been determined that an increased amount of stress may occur at stress points 94 and 96 along optic fiber 68. Stress points 94 and 96 exist at the extremes of fiber 68 between sleeve 70 and the mechanism holding the fiber in place (i.e., retaining slab 74 in the example of FIG. 2a). Thus, stress point 94 occurs immediately proximate deposit 78 which retains optic fiber 68 in retaining slab 74. Similarly, stress point 96 occurs where fiber 68 is retained by the end of sleeve 70. It has been observed that excessive flexing of optic fiber 68 may cause it to break at either of points 94 or 96. Alternatively, the flexing may loosen or weaken the retention provided by deposit 78. Clearly, such effects are undesirable. It is therefore an additional object of the present invention to provide a mechanism by which the possibility of such breakage is substantially reduced.

Figure 3A:
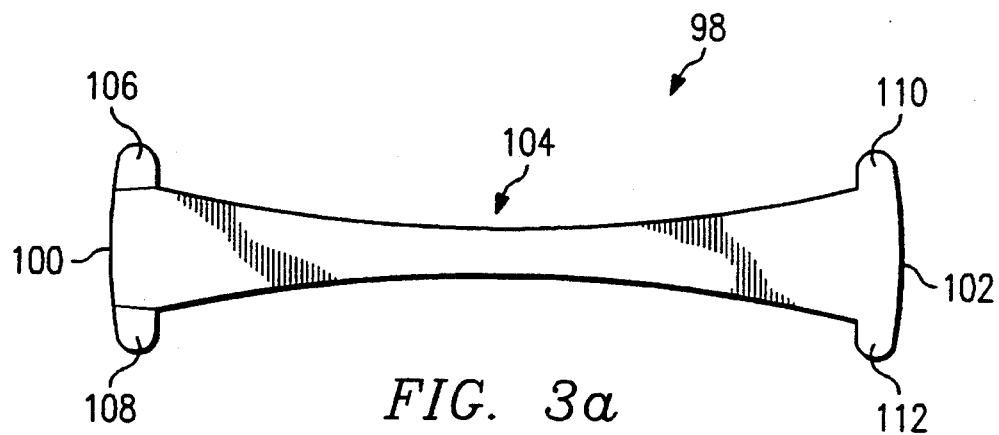
FIG. 3a illustrates a flexible member for supporting an optic fiber between its associated sleeve and mechanism for retaining it in position with respect to its related communications circuit.

FIG. 3a illustrates a top view of a flexible member 98 used in accordance with the present invention to satisfy the objective set forth immediately above; that is, to alleviate undesirable tension at stress points 94 and 96. In the preferred embodiment, flexible member 98 is made of the same material as package 58 (e.g., Kovar) so that it expands and contracts with temperature at the same rate as package 58. Flexible member 98 is preferably on the order of 0.325 to 0.400 inches in length, and 0.004 inches in thickness. As shown in FIG. 3a, flexible member 98 is shaped such that it is wider at its ends 100 and 102 then in its center 106. Specifically, ends 100 and 102 may be on the order of 0.080 inches wide while center 106 is on the order of 0.020 inches wide. Consequently, flexible member 98 is most likely to bend near its center 104 when a force is applied between ends 100 and 102. Moreover, for affixation purposes shown below, flexible element 98 may also include tabs 106, 108, 110 and 112.

Figure 3B:
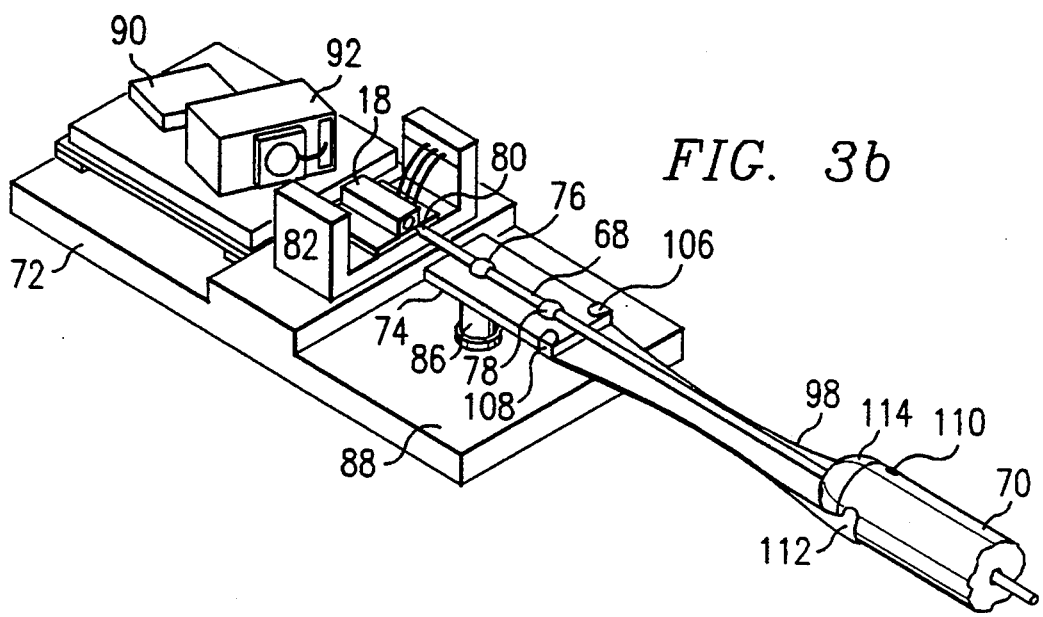

FIG. 3b illustrates a perspective view of an alternative embodiment of the present invention using flexible member 98 of FIG. 3a. Specifically, FIG. 3b illustrates carrier 72 of FIG. 2a, along with flexible member 98 affixed between retaining slab 74 and sleeve 70. In the preferred embodiment, flexible member 78 is affixed to retaining slab 74 in various ways. For example, either epoxy, solder or welding is used to affix one end of flexible member 98 to retaining slab 74. Further, tabs 106 and 108 may be wrapped around slab 74 as shown to facilitate the connection between slab 74 and flexible member 98. At its opposite end, flexible member 98 is preferably attached to the end of sleeve 70. As known in the art, sleeve 70 often includes a glass bead 114 at its end. In the preferred embodiment, flexible member 98 is attached, however, to the cylindrical length of sleeve 70 rather than to this glass bead 114. This connection prevents additional stress at the interface between the cylindrical length and bead of sleeve 70.

Figure 3C:
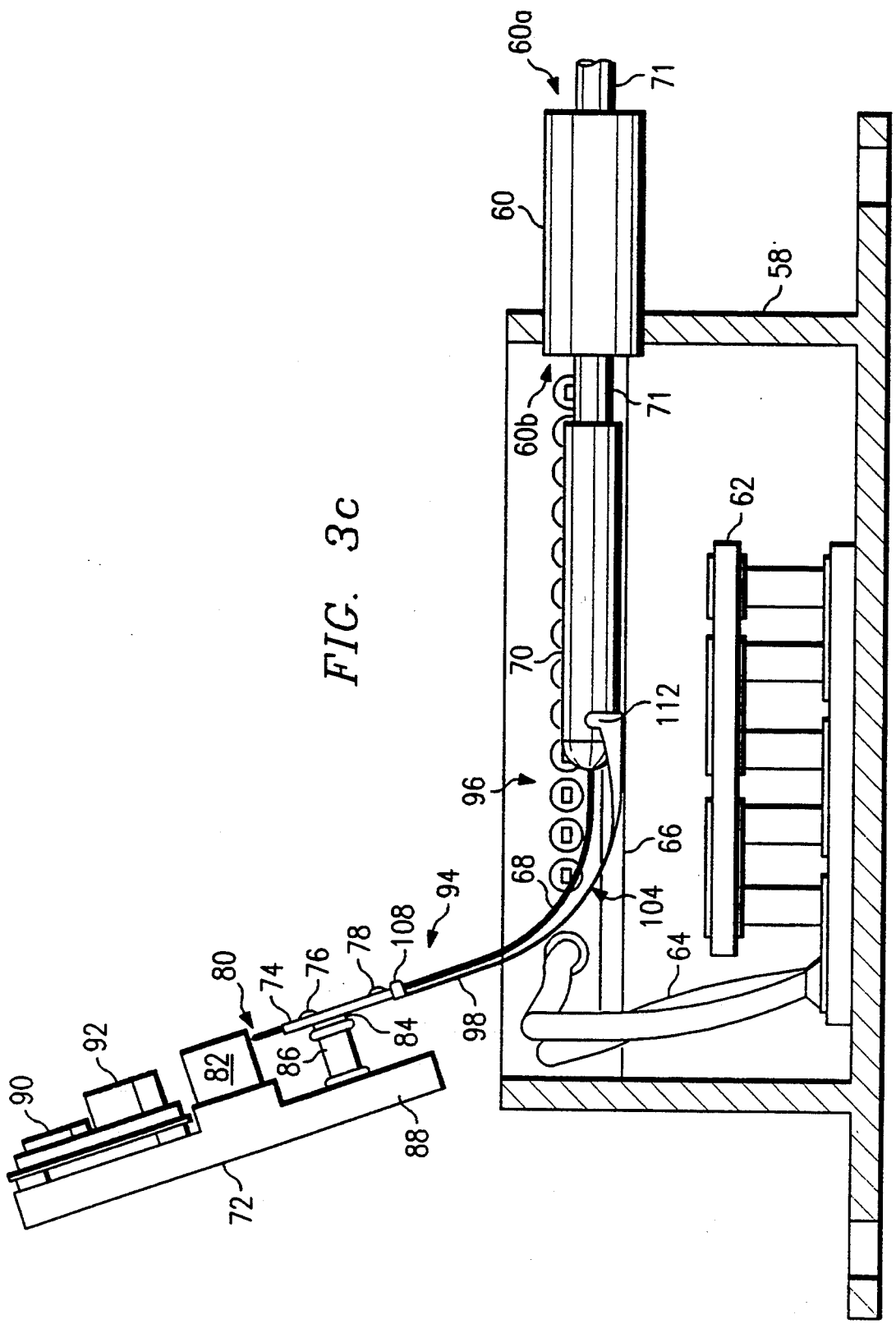
FIG. 3c illustrates the assembly of FIG. 3b being installed into an optics package, wherein the flexing of the optic fiber is caused to occur between the two fiber attachment points.

FIG. 3c illustrates a side view of the embodiment of FIG. 3b being installed in the fiber optics package 58 shown in FIG. 2a. Thus, the depiction of FIG. 3b is very similar to that of FIG. 2a, with the structural exception that flexible element 98 has been added thereto. Moreover, as readily appreciable from the perspective of FIG. 3c, the physical constraints imposed by flexible member 98 cause the majority of the bending effect of fiber 68 to occur in the area adjacent center 104 of flexible member 98. Moreover, fiber 68 remains somewhat linear near stress points 94 and 96. Consequently, one skilled in the art may readily appreciate that the addition of a flexible member causes the majority of the flex to occur along the center point of the fiber between stress points 94 and 96 where its capability of handling such stress is maximized. Moreover, the stress at points 94 and 96 is substantially reduced, thereby reducing the possibility that breakage or damage will occur at either of these points. As a result, given the additional benefits provided by the structure shown in FIGS. 3a-3c, note that the present invention not only provides a mechanism for affixing an optic fiber in place outside of an optics package, but provides the additional benefits of reducing the stress on the optic fiber while it is being installed within the desired optics package.

FIG. 4 illustrates a perspective view of an alternative embodiment of the present invention. Specifically, FIG.

4 shows an alternative flexible member 116, and an alternative mechanism for affixing a fiber in place with respect to its communications circuitry. As to this latter technology, reference is made to U.S. patent application Ser. No. 07/990,899, filed Dec. 15, 1992, entitled "Method and Apparatus for Affixing An Optic Fiber Tip in Position with Respect to a Fiber Communications Circuit", by Moore et al, assigned to Alcatel Networks Systems, Inc. and incorporated fully herein by reference.

As set forth in the above-incorporated document, a positioning member 118 affixes a fiber 120 in place with respect to a block 122. Block 122 is separate from carrier 124 so that fiber 120 may be first affixed axially within block 122. Specifically, fiber 120 is adjusted axially and, thereafter, positioning member 118 is melted so that fiber 120 is permanently affixed in position with respect to block 122. Next, block 122 is moved such that its end 128 contacts an end 130 of carrier 124. Once in contact, block 122 is moved laterally with respect to carrier 124 until the tip of fiber 120 is in the desired position with respect to the laser supported by carrier 124. Thereafter, block 122 is welded to carrier 124, thereby fixing the tip of fiber 120 in position with respect to the laser supported by carrier 124. For additional details pertaining to this block/carrier configuration, the reader is directed to the above-incorporated document.

For purposes of the present document, however, reference and focus is now made to an alternative embodiment for implementing the stress limiting feature of the present invention. Specifically, flexible member 116 is shown affixed between sleeve 126 and block 122. In the preferred embodiment, flexible member 132 is a flexible plastic tube on the order of 0.300 to 0.400 inches in length and 0.040 inches in diameter. In the preferred embodiment, fiber 120 is positioned axially through the flexible tube, and is preferably attached via an epoxy deposit 134 to the bead 138 of sleeve 126. Thus, fiber 120 extends axially within flexible tube member 116 as shown in phantom. Next, the opposite end of flexible tube 116 is affixed to block 122, preferably with a UV epoxy deposit 136. In the preferred embodiment, this latter step is performed prior to melting positioning member 118. Once flexible member 132 is in place, positioning member 118 is melted, thereby affixing fiber 120 and its tip in a relatively rigid position with respect to block 122. Thereafter, block 122 is attached to carrier 124 as discussed above and as discussed in greater detail in the above-incorporated document.

Once block 122 is attached to carrier 124, the entire configuration may be installed in a package such as package 58 shown in FIG. 3c. Again, the inclusion of flexible member 116 causes fiber 120 to flex substantially along its center as opposed to its outer ends. Consequently, the stress at the points where the fiber contacts sleeve 126 or block 122 is minimized. Thus, again the present invention permits fiber affixation outside of the optics package and subsequent loading of the fiber and its associated circuitry into a package.

FIG. 5 illustrates a perspective view of yet another alternative of a flexible member 140 in accordance with the present invention. In the embodiment of FIG. 5, flexible member 140 is a coil spring. The coil spring is attached between block 122 and sleeve 126 in the same manner as flexible member 116 described in connection with FIG. 4, above. Thus, in the embodiment of FIG. 5, UV epoxy deposits 134 and 136 are used to retain the coil spring in place. Moreover, optic fiber 120 extends axially through the center of the coil spring. After affixing fiber 120 in place and block 122 to carrier 124, the entire apparatus may be inserted in an optics package as shown in FIG. 3c. The coil spring, like flexible members 98 and 116 discussed above, causes the majority of flex along fiber 122 to occur at its center during installation into an optics package.

From the above, it may be appreciated that the present invention provides numerous advantages over the prior art. One paramount advantage is that the present invention permits affixation of an optic fiber in place with respect its associated communication circuitry outside an optics package. As such, assembly of the device is improved because access to the small and delicate components of the process is possible from five directions, as opposed to one as exemplified in FIGS. 1a-1b. This simplification saves time and reduces the possibility of damage to the various components. Yet another advantage is that numerous assemblies may be constructed outside optics packages and inventoried until it is later desired to insert them in a respective package. Consequently, the present invention allows a greater diversity in the choice of particular optics packages. In various alternative embodiments also discussed, a flexible member is utilized to centrally locate the stress to the fiber during its insertion into an optics package. Thus, the possibility of damage to the fiber is also minimized. In conclusion, the various aspects of the present invention increase product yields and reduce costs. Moreover, the various embodiments shown herein illustrate that while the present invention has been described in detail, various modifications, substitutions or alterations could be made to it without departing from its scope as defined by the following claims.

What is claimed is:

1. A method of installing an optic fiber in an optics package, wherein said fiber has a tip extending from a sleeve, comprising the steps of:

affixing a point of said fiber proximate said fiber tip in a retaining member adjacent a device for communicating signals through said fiber;

connecting a first point of a flexible member to said retaining member and a second point of said flexible member to said sleeve, such that said flexible member is parallel to said fiber and in axial alignment with said fiber, said flexible member having a selective flexibility between said first and second points; and positioning said fiber tip, said flexible member and said device for communicating signals in said optics package after said affixing step such that said flexible member selectively flexes at a flex point between said first and second points causing a corresponding flex along said fiber between said retaining member and said sleeve proximate said flex point of said flexible member.

2. The method of claim 1 wherein said sleeve comprises a cylindrical length and a bead at its end, and wherein said step of disposing a flexible member comprises attaching an end of said flexible member to said cylindrical length.

3. A method of installing an optic fiber in position with respect to a device for communicating signals through said fiber, wherein said fiber extends from a sleeve and has a tip, comprising the steps of:

affixing a first end of a flexible member to said sleeve and in axial alignment with said fiber;

affixing said optic fiber to a retaining member at a position proximate said fiber tip such that said tip is fixed in position with respect to said device for communicating signals through said fiber;

affixing a second end of said flexible member to said retaining member; and wherein said flexible member is selectively flexible between said first and second ends.

4. The method of claim 3 and further comprising the step of positioning said fiber, said flexible member and said retaining member in an optics package after said step of affixing said flexible member to said retaining member, wherein said flexible member selectively flexes between said first and second ends during said positioning step.

5. An optics assembly, comprising:
an optic fiber having a tip extending from a sleeve;
a device for communicating signals through said fiber;
a retaining member for affixing said tip proximate said device for communicating signals; and
a flexible member attached between said retaining member and said sleeve, said flexible member having the capability to selectively bend when said optics assembly is positioned in an optics package, wherein said flexible member comprises a length and a first and second end, and wherein said flexible member is more likely to flex at a point between said first and second ends in response to a bending force applied between said first and second ends.

6. The optics assembly of claim 5 wherein said flexible member has a first and second end and wherein said sleeve comprises a cylinder having a diameter and a bead at one end, wherein said first end of said flexible member is attached to said cylinder.

7. The optics assembly of claim 5 wherein said flexible member comprises a metallic length and a first and second end, and wherein said flexible member is thinner at a point between said first and second ends than at either of said first and second ends.

8. The optics assembly of claim 5 wherein said flexible member comprises a coil spring.

9. The optics assembly of claim 5 wherein said flexible member comprises a plastic tube.

10. An optics assembly, comprising:
an optic fiber having a tip extending from a sleeve, wherein said sleeve comprises a cylinder having a diameter and a bead at one end;
a device for communicating signals through said fiber;
a retaining member for affixing said tip proximate said device for communicating signals; and
a flexible member having a first and second end and attached between said retaining member and said sleeve, wherein said first end of said flexible member is attached to said bead such that said diameter of said cylinder is unaffected by said attachment of said flexible member to said cylinder, and wherein said flexible member is more likely to flex at a point between said first and second ends than at either of said first and second ends in response to a bending force applied between said first and second ends.

11. A method of minimizing breakage of an optic fiber extending from its protective sleeve and attached at an end thereof to further apparatus comprising the step of:
disposing a flexible member, having first and second ends, between said further apparatus and said protective sleeve wherein points intermediate said first and second ends are more flexible than points near said first and second ends to reduce bending stresses on said optic fiber in the vicinity of said sleeve and said further apparatus.

12. A method of minimizing inventory of fiber optic communication packages, comprising the steps of:
attaching alignable support apparatus to an end of an optic fiber remote from protective sleeving thereof to facilitate alignment processes during assembly; and
interposing a flexible member between said support apparatus and said protective sleeve to reduce bending stresses on said optic fiber in the vicinity of said sleeve and said support apparatus.

13. A method of installing an optic fiber in an optics package, wherein said fiber has a tip extending from a sleeve, comprising the steps of:
affixing a point of said fiber proximate said fiber tip in a retaining member adjacent a device for communicating signals through said fiber;
disposing a flexible member between said retaining member and said sleeve and in axial alignment with said fiber, said flexible member having a geometry which reduces bending stresses on said fiber at points proximate said retaining member and said sleeve; and
positioning said fiber tip and said device for communicating signals in said optics package after said affixing step.

* * * * *